No. 712,349. Patented Oct. 28, 1902.
J. D. WILLIAMSON, Jr.
BRAKE MECHANISM.
(Application filed June 18, 1902.)
(No Model.) 3 Sheets—Sheet 1.
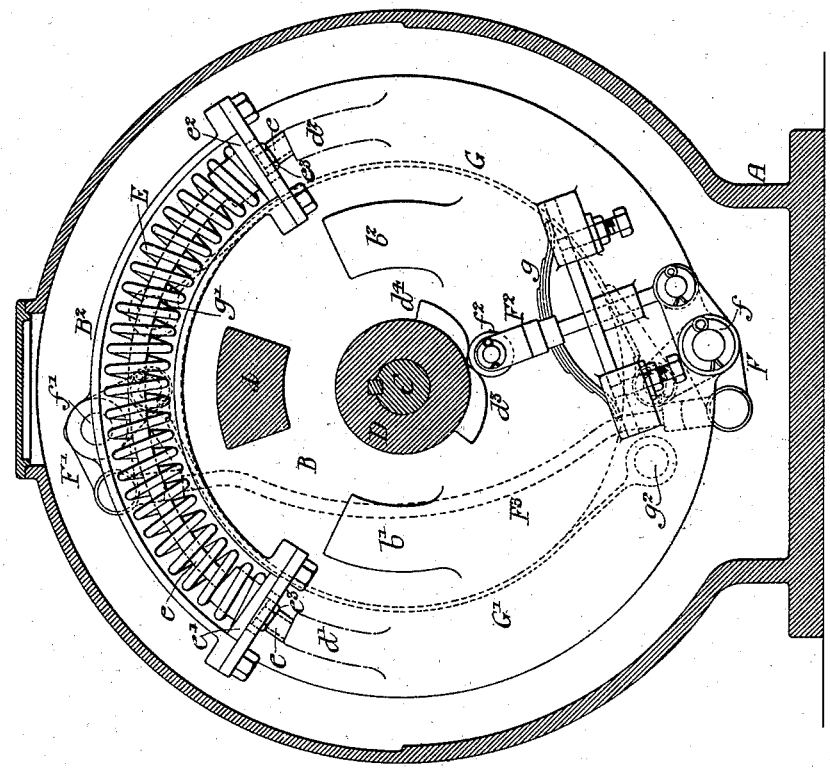
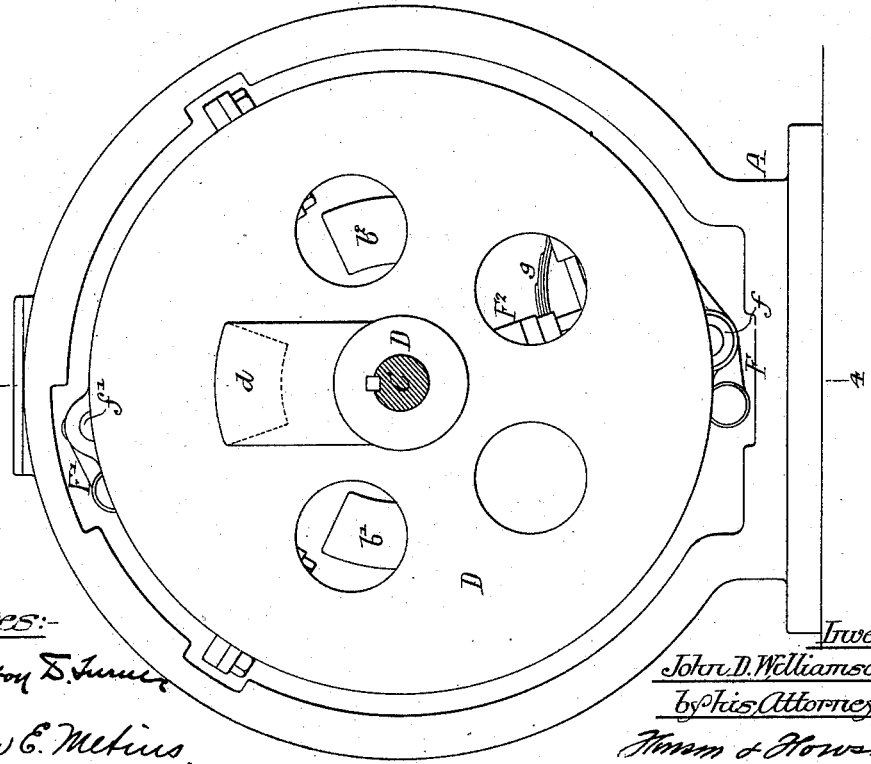
Witnesses:- Inventor
John D. Williamson Jr.
by his Attorneys;

No. 712,349. Patented Oct. 28, 1902.
J. D. WILLIAMSON, Jr.
BRAKE MECHANISM.
(Application filed June 18, 1902.)
(No Model.) 3 Sheets—Sheet 2.
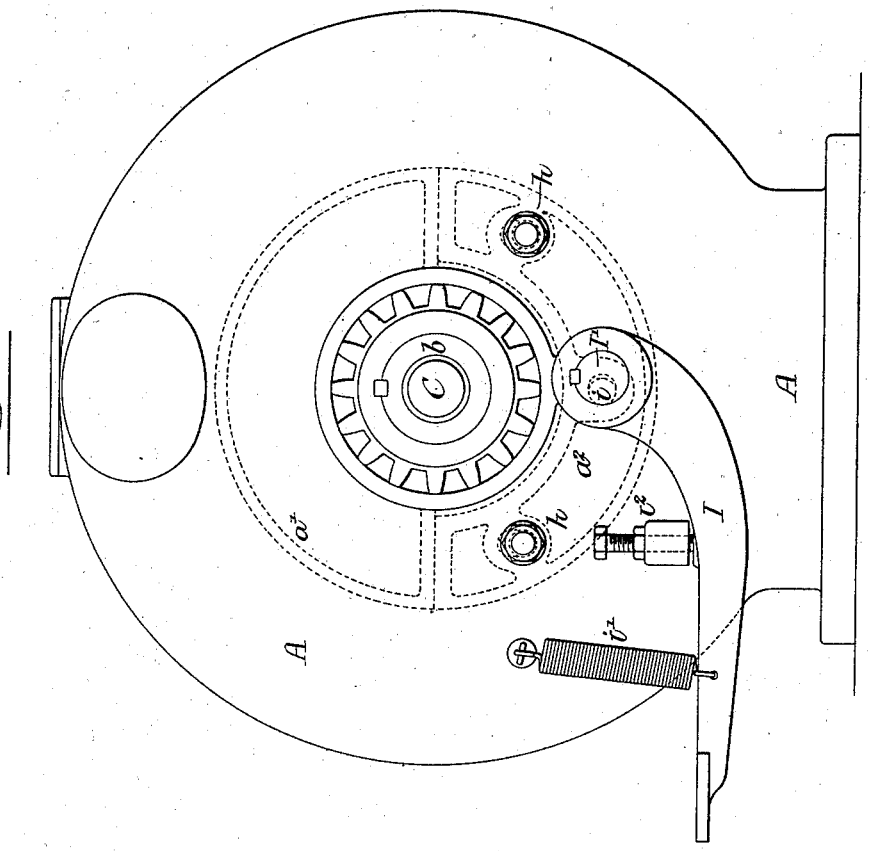
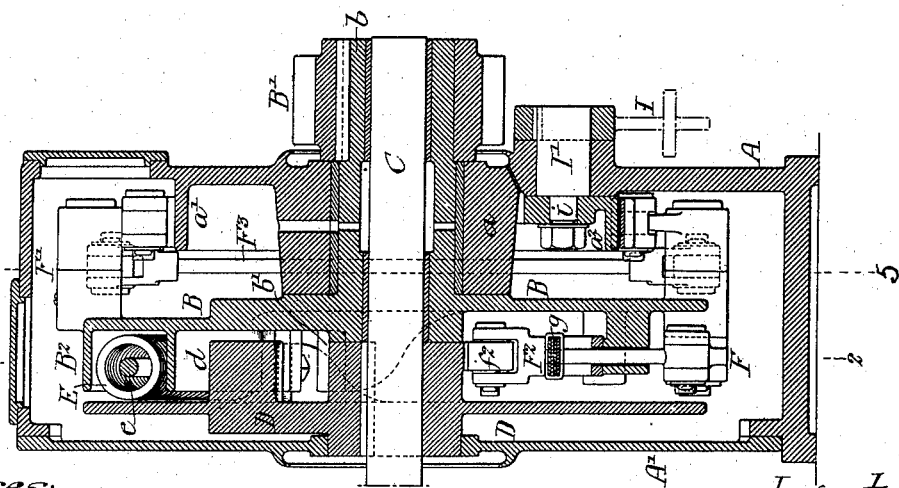

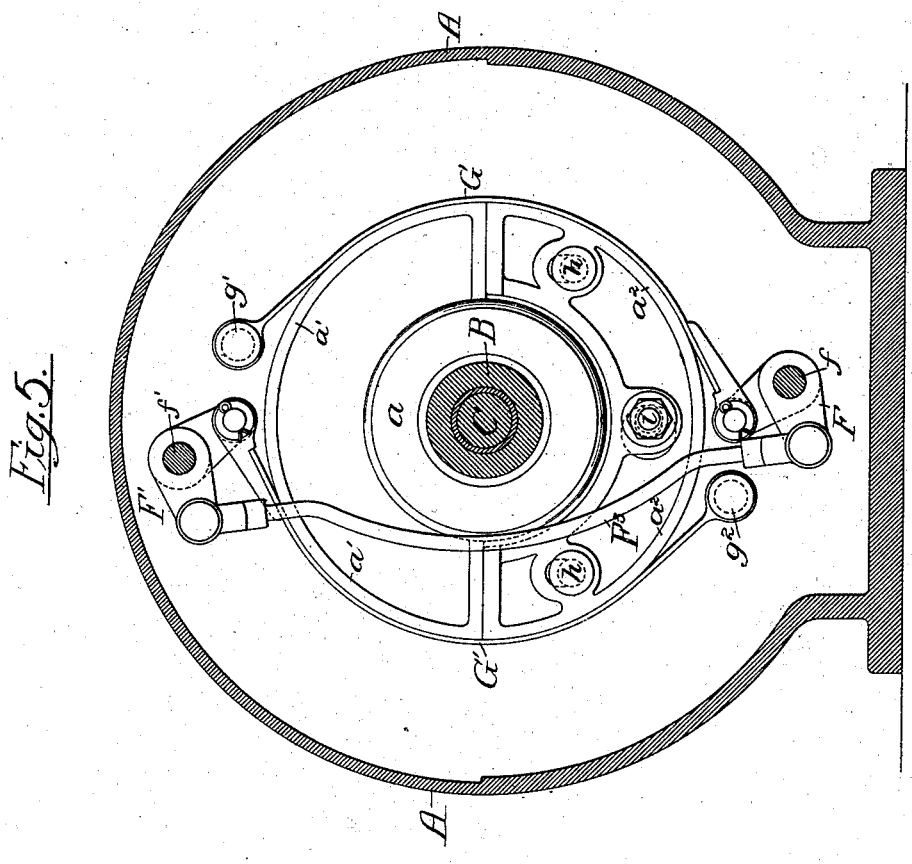

UNITED STATES PATENT OFFICE.

JOHN D. WILLIAMSON, JR., OF PHILADELPHIA, PENNSYLVANIA, ASSIGNOR TO WILLIAMSON BROTHERS COMPANY, OF PHILADELPHIA, PENNSYLVANIA, A CORPORATION OF PENNSYLVANIA.

BRAKE MECHANISM.

SPECIFICATION forming part of Letters Patent No. 712,349, dated October 28, 1902.

Application filed June 18, 1902. Serial No. 112,175. (No model.)

*To all whom it may concern:*

Be it known that I, JOHN D. WILLIAMSON, Jr., a citizen of the United States, residing in Philadelphia, Pennsylvania, have invented certain Improvements in Brake Mechanism for Motors, of which the following is a specification.

My invention relates to certain improvements in brake mechanism to be applied between a driving and a driven shaft, so that the brake will be automatically applied as soon as the driving-shaft ceases to revolve, so as to hold the driven shaft from revolving in either direction.

My invention can be applied to a shaft driven in any manner, either by hand or power; but my invention is especially applicable to driving-shafts connected to motors, such as electric motors, and is also especially adapted for use in connection with cranes, elevators, and other mechanisms for lifting loads, so that in the event of the driving-shaft stopping from any cause whatever the driven shaft will not race or run away, but will be immediately stopped by means of the automatic brake, which I will now proceed to describe.

In the accompanying drawings, Figure 1 is a front view of my improved brake mechanism with the cover-plate removed. Fig. 2 is a section on the line 2 2, Fig. 4. Fig. 3 is a rear view. Fig. 4 is a transverse sectional view on the line 4 4, Fig. 1; and Fig. 5 is a vertical sectional view on the line 5 5, Fig. 4.

A is a casing fixed to a suitable foundation and having a cap-plate A', as shown clearly in Fig. 4.

$a$ is a bearing formed on the casing A, and mounted in this bearing is the hub $b$ of a disk B. This hub extends through the rear of the casing, and on the hub is a pinion B', which in the present instance constitutes the driving member of the device.

C is a shaft free to revolve in the hub $b$, as shown, and secured to this shaft is an annular plate D. The plate D turns with the shaft, while the disk B and its pinion B' are not connected with the shaft, except indirectly, as described hereinafter. On the disk B are lugs $b'$ $c^2$, which engage a projection $d$ on the plate D. The edges of this projection are beveled, as shown clearly in Fig. 2, so as to have a flat bearing against the lugs $b'$ $b^2$.

Carried within a segmental box $B^2$ on the disk B is a coiled spring E, mounted on a segmental rod $e$, and this spring bears against plates $e'$ $e^2$ at each end of the box. Each end of the rod $e$ is screw-threaded, and on the rod are nuts $e^3$. On the plate D are two lugs $d'$ $d^2$, one arranged to bear against one end of the rod $e$ and the other against the other end of the rod, as clearly shown in Fig. 2, so that when the shaft C is turned the first action is to compress the spring E within the box, no matter in which direction the shaft is turned, and the spring is compressed before the projection $d$ comes in contact with either of the lugs $d'$ or $d^2$.

On the casing A is a brake-flange $a'$. This brake-flange is made in two parts in the present instance. The upper half is a permanent part of the frame A, while the part $a^2$ can be adjusted for the purpose described hereinafter.

F F' are two levers pivoted to the disk B at $f f'$, respectively, and one arm of the lever F is connected to a rod $F^2$, having a roller $f^2$ at its outer end. This roller is in the path of two cams $d^3$ $d^4$ on the hub of the plate D. Between a bearing on the disk B and a projection on the rod $F^2$ is a spring $g$, which tends to force the rod $F^2$ out against either of the cams $d^3$ $d^4$ for the purpose described hereinafter. One arm of the lever F is attached to an arm of the lever F' by means of a connecting-rod $F^3$, so that when movement is imparted to the lever F similar movement will be imparted to the lever F'. Attached to a third arm of the lever F is one end of a brake-band G. The other end of this brake-band is attached at $g'$ to a projection on the disk B, and attached to the second arm of the lever F' is a brake-band G', attached at $g^2$ to a projection on the disk B, so that when the rod $F^2$ is forced out by either of the cams $d^3$ or $d^4$ against the pressure of the spring $g$ the tension on the brake-bands G G' will be released and the bands will be free of the friction-flange $a'$ on the casing; but as soon as the plate D returns to its mid-position then the spring $g$ forces the rod $F^2$ out, and immediately the spring $g$ clamps the brake-bands G G' tightly upon the flange $a'$, so as to stop the rotation of the disk D, and consequently the rotation of the several parts connected therewith. Thus the driven shaft will not overrun after the motor has ceased to operate. As soon as the motor is thrown into gear again the brake mechanism will be immediately released. Thus the mechanism is entirely automatic.

In order to apply a foot or hand brake to the mechanism, I make the flange $a'$ in two parts. One part, as indicated in the sectional view, Fig. 4, is a permanent part of the casing A, while the other half of the flange is made of a separate piece $a^2$, secured to the casing by bolts $h\ h$, Fig. 3, so that this section $a^2$ will slide to and from the fixed section.

I is a foot-lever secured to a short shaft I', mounted in a bearing in the frame A, and this shaft has an eccentric-pin $i$, which enters the opening in the movable section $a^2$, as shown clearly in Figs. 3 and 4.

$i'$ is a spring attached to the foot-lever and to the casing, so as to keep the foot-lever I elevated and to keep the two parts of the flange together.

$i^2$ is an adjustable screw-stop to limit the upward movement of the foot-lever I.

When it is wished to apply the brake at any time, all that is necessary is to simply press upon the foot-lever I, which will separate the movable section $a^2$ of the brake-flange from the section $a'$, causing it to bear upon the brake-bands G G' to stop the rotation of the parts. This lever may be a hand-lever in some instances, and it may be dispensed with entirely.

I claim as my invention—

1. The combination in automatic brake mechanism, of a driving member, a driven member, brake mechanism for the driven member and means for automatically applying said brake mechanism as soon as the driving mechanism ceases to revolve, and means for releasing the brake mechanism as soon as motion is imparted to the driving member, substantially as described.

2. The combination in automatic brake mechanism for a power-driven device, of a casing having a brake-flange, a disk, brake mechanism carried thereby and in engagement with the flange, a shaft, a plate carried by the shaft and arranged to engage the disk, with means on the plate for throwing the brake mechanism out of action, substantially as described.

3. The combination of a casing having a brake-flange thereon, a disk, brake mechanism carried by said disk arranged to act upon the brake-flange, a shaft, a plate carried by said shaft, lugs on the disk, and a lug on the plate, with yielding mechanism between the plate and the disk, and mechanism carried by the plate for releasing the brakes, substantially as described.

4. The combination of a casing having a brake-flange, a disk mounted in said casing, a pinion on the disk, brake mechanism carried by the disk and arranged to engage the brake-flange, a spring for applying the brake mechanism, a shaft, a disk on the shaft, cams on the disk actuating the brake mechanism against the pressure of the springs, a projection on the plate engaging projections on the disk, a spring and a rod carried by the disk, and lugs on the plate engaging the rod so as to compress the spring before the projection comes in contact with the lugs, substantially as described.

5. The combination of a fixed casing, a brake-flange thereon, a disk having a hub mounted in the casing, a pinion on the end of the hub, a shaft, a plate on the shaft, a projection on the plate, lugs on the disk, a segmental rod, a coiled spring carried by said rod and mounted in a box on the disk, lugs on the plate arranged to engage the rod to compress the spring, brake-levers pivoted to the disks, brake-bands connected to said levers and acting upon the brake-flange of the casing, a rod connecting the two brake-levers, a rod attached to one of the brake-levers, a spring acting upon said rod to clamp the brake-bands to the brake-flange, and cams on the hub of the plate arranged to actuate the rod against the pressure of the spring, substantially as described.

6. The combination in a brake mechanism, of a casing, a brake-flange thereon, said brake-flange being made in two parts, one part being fixed, the other movable, means for moving the movable part, a disk, brake mechanism carried by the disk arranged to bear upon the two-part flange, a shaft, a plate secured to said shaft, and means connecting the plate to the disk, substantially as described.

In testimony whereof I have signed my name to this specification in the presence of two subscribing witnesses.

JOHN D. WILLIAMSON, JR.

Witnesses:
WILL. A. BARR,
JOS. H. KLEIN.